United States Patent [19]
Gilbank

[11] 3,869,053
[45] Mar. 4, 1975

[54] LOADING RIGID SHEET MATERIALS

[75] Inventor: Roland E. Gilbank, Oshawa, Ontario, Canada

[73] Assignee: PPG Industries, Inc., Pittsburgh, Pa.

[22] Filed: July 20, 1973

[21] Appl. No.: 381,224

[30] Foreign Application Priority Data
Apr. 4, 1973   Canada ............................... 167959

[52] U.S. Cl. .................. 214/41, 198/177, 198/180, 214/15
[51] Int. Cl. .............................................. B65g 67/04
[58] Field of Search ........ 214/15, 41; 198/180, 177; 17/11

[56] References Cited
UNITED STATES PATENTS
2,478,034   8/1949   Zademach ......................... 198/180
3,178,045   4/1965   Davidson ........................... 198/180
3,537,127   11/1970  Brugman ............................... 17/11

Primary Examiner—Robert J. Spar
Assistant Examiner—G. L. Auton
Attorney, Agent, or Firm—Darby & Cushman Cushman

[57] ABSTRACT

Apparatus for assisting the loading of a rigid sheet, such as a glass sheet, into gripping engagement with a plurality of self-closing tongs includes a stabilizing device which inhibits tong oscillation and provides a guide surface for the upper edge of the sheet during loading of the tongs. The stabilizing device is moved away from the loaded tongs at the end of the loading operation and vice versa.

8 Claims, 5 Drawing Figures

LOADING RIGID SHEET MATERIALS

BACKGROUND OF THE INVENTION

This invention relates to an apparatus for handling rigid sheet material and particularly for assisting the placement or loading of a rigid sheet into gripping engagement with a plurality of self-closing tongs. While the invention may be used in conjunction with various types of rigid sheet materials, it has special utility in connection with the handling of various sizes and shapes of glass sheets.

It is well known in the glass making art to manually load glass sheets in self-closing tongs before conveying the sheet through, for example, a lehr where the glass sheets are heated to temperatures sufficiently high as to permit subsequent press bending or tempering operations to be carried out on the tong-suspended sheets. However, conventional manual loading operations require a substantial degree of effort and skill on the part of the operator. The tongs are freely suspended from their carriage or carriages and thus are apt to move or oscillate in directions having components normal and/or parallel to the glass surface thus making it difficult for the operator to effect simultaneous engagement of all the tongs with the upper edge of the sheet. One or more of the tongs may tilt away from vertical orientation as the upper edge of the glass enters the glass gripping region of the tongs whereupon the operator will be obliged to manipulate or shake the glass sheet slightly in an attempt to make these tongs engage the sheet properly. If all of the tongs do not engage the sheet properly, some of the tongs will carry more weight than others in which event the points of the overloaded tongs will make overly deep dimples in the glass surface and possibly cause distortion of the glass in the immediate vicinity of such dimples. On the other hand, under certain circumstances, the glass may not enter fully into the tongs during loading in which event some or all of the tongs grip the glass too close to its upper edge. This may result in the upper edge of the glass being deformed with convex humps being formed on the upper edge in the region of those tong points which have gripped the glass too close to said upper edge. It is also important that each tong engage the glass at the correct horizontal position along the length of the sheet in order to avoid interference between the tongs and the press blocks during press bending and, as those skilled in the art will appreciate, it is also very important to ensure that the glass sheet is loaded in the correct horizontal position relative to the vertical center line of the carriage.

The above problems are compounded when extra large sheets are being processed since larger numbers of support tongs must be used; in addition, two operators may have to be used to handle the heavy sheets in which event they must be able to co-ordinate their movements very closely if adequate results are to be achieved. Wastage of time and operator fatigue are also problems which must be taken into consideration.

SUMMARY OF THE INVENTION

It is a general object of the present invention to provide ways and means of alleviating the above mentioned problems inherent in prior art manual tong loading techniques.

Accordingly, the present invention provides, in one aspect, apparatus for use in a sheet loading station for assisting the loading of a rigid sheet into gripping engagement with a plurality of self-closing tongs, which tongs are freely suspended in spaced relation along a given surface. The invention includes means to limit the amount each of said tongs pivots in directions having components both normal to and parallel to said given surface. Means are provided to guide the movement of the upper portion of the rigid sheet in an upward direction along said given surface and are arranged such that upward movement of said rigid sheet along the movement guide means brings the upper portion of the sheet into contact with the self-closing tongs to cause the tongs to open and to receive the upper portion of the sheet. By virtue of the movement guide means and the means for limiting the pivoting motion of the tongs, the tongs remain in proper orientation relative to the rigid sheet and are able to close substantially simultaneously to grip and support the sheet when a force on the sheet causing the upward movement thereof is relieved.

In a typical embodiment, the tongs will, of course, be suspended from a suitable carriage. The carriage may be arranged for travel in a vertical direction, as, for example, in a vertical glass tempering line or alternatively the carriage may be arranged for travel in a horizontal or even an inclined path.

A further feature of the invention provides additional guide means for engagement with an end portion of the sheet as it is moved upwardly into engagement with the tongs whereby to ensure that the sheet is loaded in its correct horizontal position relative to the vertical center line of the carriage.

A still further feature of the invention provides motion producing means for retracting said means for limiting the pivotal motion of the tongs and said movement guide means away from the tongs and the sheet suspended therefrom thus to permit the loaded carriage to be moved away from the loading station and an empty carriage to be moved into a loading position, after which the motion producing means may be actuated to advance the above referred to means just prior to commencement of a further loading operation.

BRIEF DESCRIPTION OF THE VIEWS OF DRAWINGS

DESCRIPTION OF THE PREFERRED EMBODIMENT

With reference to the drawings there is seen a typical glass loading station L including a carriage 10 arranged for movement along either a horizontal or a vertical conveyor line (not shown) in a manner well known in the prior art. The conveyor line may extend through a heating lehr and then through press bending or tempering stations (not shown) in the usual fashion.

Figure 5:
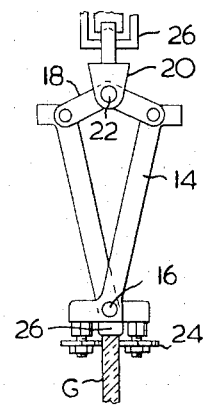
FIG. 5 is an enlarged view of typical glass gripping tongs employed in the practice of the invention.

Suspended below carriage 10 are a plurality of spaced apart self-closing glass gripping tongs 12 as best seen in FIG. 5. The tongs are of conventional construction and include a pair of tong arms 14 pivoted together at a common hinge pin 16. The upper portions of arms 14 are connected by link pins to links 18, the latter being connected to support 20 by a common link pin 22. The lower ends of the tong arms carry conventional glass engaging and gripping elements 24 which may be of the known disc variety as shown or alternatively of the "point" variety as illustrated for example in U.S. Pat. No. 2,991,114 issued July 4, 1961 to Robinson et al. The tongs also include a stop member 26 to limit the depth to which a glass sheet G may be inserted between the glass engaging elements 24.

The support 20 is connected to carriage 10 by a suitable suspension linkage 26 which acts to freely suspend the tongs 12 from the carriage 10 whereby the tongs are free to pivot in all directions as seen in a horizontal plane. A suspension linkage suitable for these purposes is shown in U.S. Pat. No. 3,178,045 issued Apr. 13, 1965 to Davidson Jr. et al.

The several tongs 12 are suspended from carriage 10 such that their glass gripping elements 24 lie substantially in a common vertical plane V (see FIG. 4) whereby they are capable of engaging the upper edge of a flat glass sheet inserted therebetween; on the other hand, the glass gripping elements 24 need not necessarily lie in the same horizontal plane but rather they could be at different elevations to permit gripping of a curved upper edge of a sheet to be effected. For purposes of the present description, however, the tongs 12 and their gripping elements 24 are all located at substantially the same elevation for gripping a straight upper edge of the glass.

In accordance with the invention there is provided apparatus 30 for use in sheet loading station L for assisting the loading of a rigid glass sheet G into gripping engagement with the self-closing tongs 12. Apparatus 30 includes an elongated vertically disposed wall member 32 having a plurality of vertically disposed recesses 34 therein, recesses 34 each being spaced apart from one another and dimensioned to receive a portion of a respective one of the freely suspended tongs 12. The number of recesses must be at least equal to the number of tongs. Wall member 32 is associated with means for retracting and advancing the same between the full line and dashed line positions shown in FIG. 4, which means will be described hereinafter.

Wall member 32 comprises a rigid flat backing plate 36, and a face plate 38 rigidly secured thereto by fasteners 40. A number of washer-spacers 42 are located between plates 36 and 38 to provide a desired spacing between the plates thus serving to provide the desired depth for each recess 34 as measured normal to the flat face of wall member 32. The depth of each recess 34 is such that when the wall member 32 is in the advanced loading position shown in full lines in FIG. 4 with the tongs 12 disposed in the respective recesses 34 and with one side of each tong lightly in contact with backing plate 36, the tongs 12 project outwardly from the surface of face plate 38 by an amount sufficient such that when the upper edge of a glass sheet G is slid upwardly along the surface of the face plate, said upper edge can readily enter between the glass engaging elements 24 of tongs 12 as will be described in more detail hereinafter.

Each recess 34 has a width (measured in the horizontal direction parallel to the surface of the fact plate) which is slightly greater than the thickness dimension of the tongs 12 whereby the tongs may readily enter into or move out of such recesses without binding or sticking.

Figure 4:
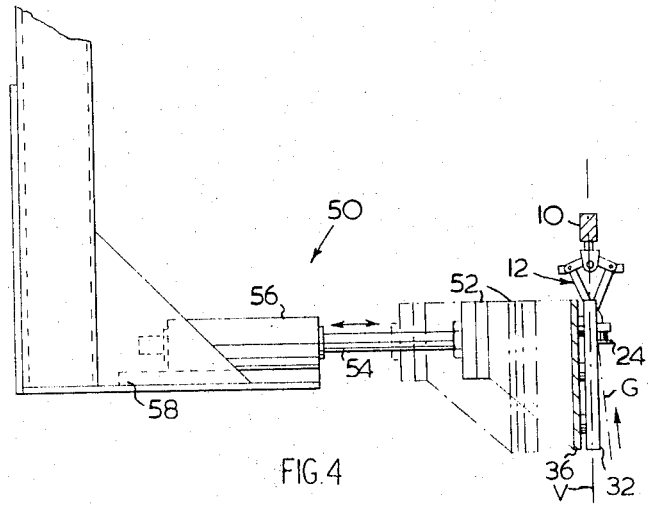
FIG. 4 is an end elevation view of the apparatus of FIG. 2.

When the wall member 32 is in the loading position shown in full lines in FIG. 4, the surface of face plate 38 substantially coincides with a vertical plane V passing through the center line of the carriage 10. When wall member 32 is in this position, with the tongs 12 disposed in the respective recesses 34, it will be seen that pivotal movement or oscillation of the tongs 12 in directions having components normal to vertical plane V is limited or inhibited simultaneously by virtue of the contact, or near contact, of the tongs with backing plate 36. Furthermore, since each recess 34 is only slightly greater in width than the tong thickness dimension, pivotal movement of the tongs 12 in directions parallel to vertical plane V is substantially and simultaneously prohibited.

The surface of face plate 38, which preferably has a thin rubber covering bonded thereto to avoid glass marring, serves as a means to guide the movement of the upper edge of a glass sheet in an upward direction along the vertical plane V. Continued upward movement of the glass sheet G brings the upper edge of the sheet into contact with the glass engaging portions of the tongs 12 and lifts them upwardly thus causing the glass engaging elements 24 of the tongs to open whereupon the glass sheet enters therebetween to a depth determined by the above mentioned tong stop members 26. When the upward lifting forces on the glass G are removed the self-closing tongs close substantially simultaneously to firmly grip the glass sheet G therebetween.

It will also be noted that a further guide means 44 is located near one end of wall member 32. Guide 44 includes a portion 46 which extends outwardly from the surface of wall member 32 at right angles thereto. When the glass G is being loaded, the end of the sheet is maintained in engagement with the outwardly extending portion 46 to ensure that the sheet is loaded in the tongs in its correct horizontal position relative to the vertical center line of the carriage. Provision is made to adjust guide means 44 to accommodate different sizes of glass.

Figure 1:
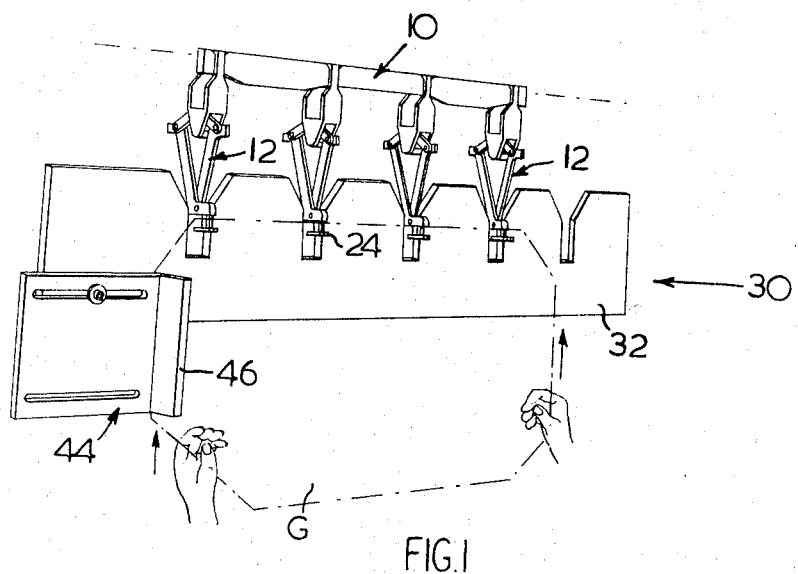
FIG. 1 is a perspective view of a glass loading station employing apparatus according to the invention.
Figure 2:
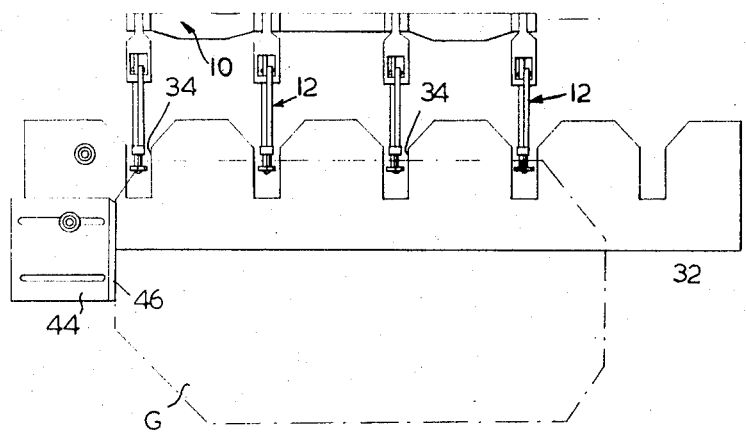
FIG. 2 is a side elevation view of apparatus according to the invention.
Figure 3:
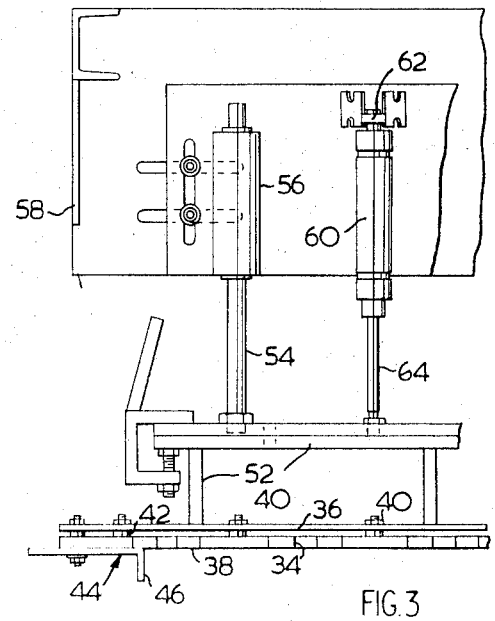
FIG. 3 is a fragmentary plan view of the apparatus of FIG. 2.

After loading the glass as described above, the wall member 32 must be retracted to clear the carriage, the tongs and the glass supported thereby. The retracted position of wall member 32 is shown in dashed lines in FIG. 4 as described previously. In order to support wall member 32 and to effect advancement and retraction of same, a support assembly 50 is provided. This assembly includes a bracket 52 connected to wall member 32. A plurality of horizontally extending cylindrical support rods 54 (only one is shown in FIG. 3) are secured to bracket 52, each rod 54 slidably extending through a respectively associated linear support bearing 56. Each linear bearing 56 is mounted on a rigid support frame 58, the latter being rigidly secured in any suitable manner relative to the conveyor line (not shown). In order to effect the retraction and advancement, an air cylinder 60 is provided, one end of same being connected at 62 to support frame 58 and the ram 64 of the cylinder being connected to bracket 52. The air cylinder 60 may be actuated by a solenoid valve which, in turn, is actuated from the conveyor line drive to cause cylinder 60 to retract wall member 32 just before the loaded carriage is moved away from the loading station and to advance wall member 32 immediately after an empty carriage has arrived in the loading station.

Those skilled in the art will appreciate that the use of the present invention greatly facilitates the work of the operator during the loading operation. Since the tongs are held in stable positions during loading and by virtue of the glass movement guide means provided, the problems outlined in the first portion of this specification have been alleviated very significantly thus making the overall operation more efficient.

I claim:

1. Apparatus for assisting the loading of a rigid sheet into substantially simultaneous gripping engagement with a plurality of freely suspended self-closing tongs spaced apart along a given surface comprising tong pivotal motion limiting means adapted for positioning sufficiently close to the position occupied by each of said self-closing tongs when the latter are freely suspended and constructed and arranged to simultaneously limit the amount of pivotal movement of each of said freely suspended tongs in directions having components both normal to and parallel to said given surface and movement guide means associated with the tong pivotal motion limiting means to guide the movement of an upper portion of the rigid sheet in an upward direction along said given surface and arranged such that upward movement of the rigid sheet along said movement guide means brings said upper sheet portion into contact with the self-closing tongs to cause the tongs to open and receive said upper sheet portion, whereby said tongs remain in proper location or orientation relative to the rigid sheet and thereafter close to substantially simultaneously grip and support the sheet when a force on the sheet causing said upward movement is relieved.

2. Apparatus for handling rigid sheet material comprising a carriage movable along a path of travel, a plurality of self-closing tongs, and linkages freely suspending said tongs from said carriage, said tongs being in spaced apart relation along a given surface, tong pivotal motion limiting means adapted for positioning sufficiently close to the position occupied by each of said self-closing freely suspended tongs and constructed and arranged to simultaneously limit the amount of pivotal movement of each of said freely suspended tongs in directions having components both normal to and parallel to said given surface and movement guide means associated with the tong pivotal motion limiting means to guide the movement of an upper portion of the rigid sheet in an upward direction along said given surface and arranged such that upward movement of the rigid sheet along said movement guide means brings said upper sheet portion into contact with the self-closing tongs to cause the tongs to open and receive said upper sheet portion, whereby said tongs remain in proper location or orientation relative to the rigid sheet and thereafter close to substantially simultaneously grip and support the sheet when a force on the sheet causing said upward movement is relieved.

3. Apparatus according to claim 1 wherein sheet end portion engaging guide means are provided for engagement with an end portion of the sheet as it is moved in said upward direction whereby to ensure that the sheet is loaded in its correct horizontal position relative to the vertical center line of the carriage.

4. Apparatus according to claim 2 wherein sheet end portion engaging guide means are provided for engagement with an end portion of the sheet as it is moved in said upward direction whereby to ensure that the sheet is loaded in its correct horizontal position relative to the vertical center line of the carriage.

5. Apparatus according to claim 2 further including motion producing means for advancing and retracting said tong pivotal motion limiting means and said movement guide means towards and away from said carriage and the tongs suspended therefrom.

6. Apparatus according to claim 1 wherein said tong pivotal motion limiting means for limiting the pivotal movement of the tongs comprises a member having a number of recesses therein, the number of recesses being at least equal to the number of tongs, each recess arranged to receive a portion of a respective one of said tongs and being sized to effect said limiting of the pivotal movement of the tongs, and a surface portion of said member defining said movement guide means along which said upper sheet portion is moved.

7. Apparatus according to claim 2 wherein said tong pivotal motion limiting means for limiting the pivotal movement of the tongs comprises a member having a number of recesses therein, the number of recesses being at least equal to the number of tongs, each recess arranged to receive a portion of a respective one of said tongs and being sized to effect said limiting of the pivotal movement of the tongs, and a surface portion of said member defining said movement guide means along which said upper sheet portion is moved.

8. Apparatus according to claim 1 further including motion producing means for advancing and retracting said tong pivotal motion limiting means and said movement guide means towards and away from said carriage and the tongs suspended therefrom.

* * * * *